(12) United States Patent
De Muynck

(10) Patent No.: US 10,986,338 B2
(45) Date of Patent: Apr. 20, 2021

(54) THERMAL-IMAGE BASED VIDEO COMPRESSION SYSTEMS AND METHODS

(71) Applicant: FLIR Systems, Inc., Wilsonville, OR (US)

(72) Inventor: Steffen De Muynck, Wevelgem (BE)

(73) Assignee: FLIR Systems, Inc., Wilsonville, OR (US)

( * ) Notice: Subject to any disclaimer, the term of this patent is extended or adjusted under 35 U.S.C. 154(b) by 0 days.

(21) Appl. No.: 16/209,586

(22) Filed: Dec. 4, 2018

(65) Prior Publication Data

US 2019/0110047 A1 Apr. 11, 2019

Related U.S. Application Data

(63) Continuation of application No. PCT/US2017/035555, filed on Jun. 1, 2017.

(Continued)

(51) Int. Cl.
| | |
|---|---|
| *H04N 19/12* | (2014.01) |
| *H04N 19/85* | (2014.01) |
| *H04N 19/119* | (2014.01) |
| *H04N 19/44* | (2014.01) |
| *H04N 19/184* | (2014.01) |

(Continued)

(52) U.S. Cl.
CPC .............. *H04N 19/12* (2014.11); *H04N 5/33* (2013.01); *H04N 19/119* (2014.11); *H04N 19/184* (2014.11); *H04N 19/30* (2014.11); *H04N 19/44* (2014.11); *H04N 19/48* (2014.11); *H04N 19/85* (2014.11); *H04N 21/236* (2013.01);

(Continued)

(58) Field of Classification Search
None
See application file for complete search history.

(56) References Cited

U.S. PATENT DOCUMENTS

| | | |
|---|---|---|
| 6,028,309 A | 2/2000 | Parrish et al. |
| 2009/0154698 A1* | 6/2009 | Chen ................... H04N 7/167 380/240 |

(Continued)

FOREIGN PATENT DOCUMENTS

EP 2073545 6/2009

OTHER PUBLICATIONS

Pece et al., "Adapting Standard Video Codecs for Depth Streaming", Joint Virtual Reality Conference of Euro VR—EGVE, Sep. 2011, pp. 59-66, Nottingham, UK.

*Primary Examiner* — Kate H Luo
(74) *Attorney, Agent, or Firm* — Haynes and Boone, LLP

(57) ABSTRACT

A system for capturing a thermal video stream includes a thermal image capture component, such as an IR camera, configured to capture and digitize the thermal video stream having n-bits of data per pixel, a memory configured to store the captured thermal images, and a processor. The processor is configured to select captured thermal images as frames for a video stream and subdivide each captured thermal image into separate m-bit and k-bit image streams. The processor is further configured to compress the m-bit thermal image stream in a video compression format that includes frame and metadata, compress the k-bit image stream using a lossless or substantially lossless compression format, and incorporate the compressed k-bit image stream into the coded m-bit video stream as metadata.

20 Claims, 6 Drawing Sheets

Related U.S. Application Data

(60) Provisional application No. 62/354,605, filed on Jun. 24, 2016.

(51) Int. Cl.

| | | |
|---|---|---|
| *H04N 19/48* | (2014.01) | |
| *H04N 5/33* | (2006.01) | |
| *H04N 21/234* | (2011.01) | |
| *H04N 19/30* | (2014.01) | |
| *H04N 21/2365* | (2011.01) | |
| *H04N 21/236* | (2011.01) | |
| *H04N 21/2343* | (2011.01) | |

(52) U.S. Cl.
CPC ... *H04N 21/2365* (2013.01); *H04N 21/23424* (2013.01); *H04N 21/234327* (2013.01)

(56) References Cited

U.S. PATENT DOCUMENTS

| | | | |
|---|---|---|---|
| 2010/0309315 A1* | 12/2010 | Hogasten | H04N 5/33 |
| | | | 348/164 |
| 2012/0127533 A1 | 5/2012 | Triplett et al. | |
| 2013/0235072 A1* | 9/2013 | Longhurst | H04N 1/46 |
| | | | 345/605 |
| 2015/0130949 A1 | 5/2015 | Christison et al. | |

\* cited by examiner

THERMAL-IMAGE BASED VIDEO COMPRESSION SYSTEMS AND METHODS

CROSS-REFERENCE TO RELATED APPLICATIONS

This application is a continuation of International Patent Application No. PCT/US2017/035555 filed Jun. 1, 2017 and entitled "THERMAL-IMAGE BASED VIDEO COMPRESSION SYSTEMS AND METHODS," which is incorporated herein by reference in its entirety International Patent Application No. PCT/US2017/035555 filed Jun. 1, 2017 claims priority to and the benefit of U.S. Provisional Patent Application No. 62/354,605 filed on Jun. 24, 2016 and entitled "THERMAL-IMAGE BASED VIDEO COMPRESSION SYSTEMS AND METHODS," which is hereby incorporated by reference in its entirety.

TECHNICAL FIELD

The present application relates generally to thermal imaging and, more particularly, to systems and methods for compressing thermal-image data.

BACKGROUND

Thermal infrared cameras are well known and used in a wide variety of applications. A typical thermal infrared camera, often referred to simply as an infrared camera or IR camera, uses an infrared detector to detect infrared energy that is provided to the infrared detector through an infrared camera lens—a lens capable of transmitting infrared energy. The infrared camera generates an image based on the infrared energy and the image may be processed and stored locally or transmitted (e.g., via a wireless or wired network) for remote viewing and/or storage.

A conventional IR camera includes focal plane arrays (FPAs) that detect infrared (IR) radiation to generate thermal images. Thermal radiation passing through an optical path of an IR camera is received by IR detectors of the FPA, which provide image data for pixels of thermal images. High resolution and high bit depth is often desirable for viewing and image processing, but large image and file sizes are not always feasible for many systems and applications which may be limited by hardware, software, network and processing capabilities. As a result, the resolution and/or bit depth of acquired thermal images may be down-converted and compressed as a video stream using a video compression format (e.g., H.264 or MPEG4) for further image processing, storage and playback by the system or network. For example, the FPA of an IR camera may be capable of acquiring 14-bit thermal images, but if the hardware or software of the IR camera, network or image processing systems, or real-time processing requirements cannot be met with 14-bit file sizes, then the stream may need to be down-converted (such as to 8-bit thermal images) resulting in a loss of image information.

This problem is often encountered when adding or replacing an IR camera in an existing network or image processing system. For example, an IR camera may be integrated within a system for monitoring and controlling vehicle and pedestrian traffic. The system may include detection technology to identify the presence or absence of objects within a field of view of the IR camera. By detecting the heat signatures of vehicles, bicycles, and pedestrians, an IR camera can be used in a traffic system to monitor traffic patterns and control signal timing in a variety of lighting and weather conditions. However, object detection is more accurate at higher resolutions and bit-depth and the loss of information due to down sampling or compression at one part of the system or network may degrade performance of the object detection and image processing elsewhere in the system. There is therefore a need for improved systems and methods for processing thermal video images.

SUMMARY

Systems and methods are disclosed for processing thermal video images. In various embodiments, an IR camera captures thermal image data in real time, producing a thermal video stream that is compressed, for example, using a video compression algorithm such as H.624 or MPEG4.

In one embodiment, a method includes capturing a sequence of 14-bit thermal images of a scene by an image capture component and dividing each image into 8-bit and 6-bit component images. The 8-bit component images are combined as frames of first video stream in a video compression format that includes video data and metadata. The 6-bit component images are combined as frames of a second video stream in a video compression format. The second video stream is incorporated as metadata to the first video stream, allowing the first video stream to be processed on both 8-bit and 14-bit components.

In another embodiment, a system for capturing a thermal video stream includes a thermal image capture component, such as an IR camera, configured to capture and digitize the thermal video stream having n-bits of data per pixel, a memory configured to store the captured thermal images, and a processor. The processor is configured to select captured thermal images as frames for a video stream and subdivide each captured thermal image into separate m-bit and k-bit image streams, where k=−m. The processor is further configured to compress the m-bit thermal image stream in a video compression format that includes frame and metadata, compress the k-bit image stream using a lossless or substantially lossless compression format, and incorporate the compressed k-bit image stream into the coded m-bit video stream as metadata.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Aspects of the disclosure and their advantages can be better understood with reference to the following drawings and the detailed description that follows. It should be appreciated that like reference numerals are used to identify like elements illustrated in one or more of the figures, wherein showings therein are for purposes of illustrating embodiments of the present disclosure and not for purposes of limiting the same. The components in the drawings are not necessarily to scale, emphasis instead being placed upon clearly illustrating the principles of the present disclosure.

DETAILED DESCRIPTION

In accordance with various embodiments of the present disclosure, systems and methods for processing and compressing thermal images are provided.

Figure 1:
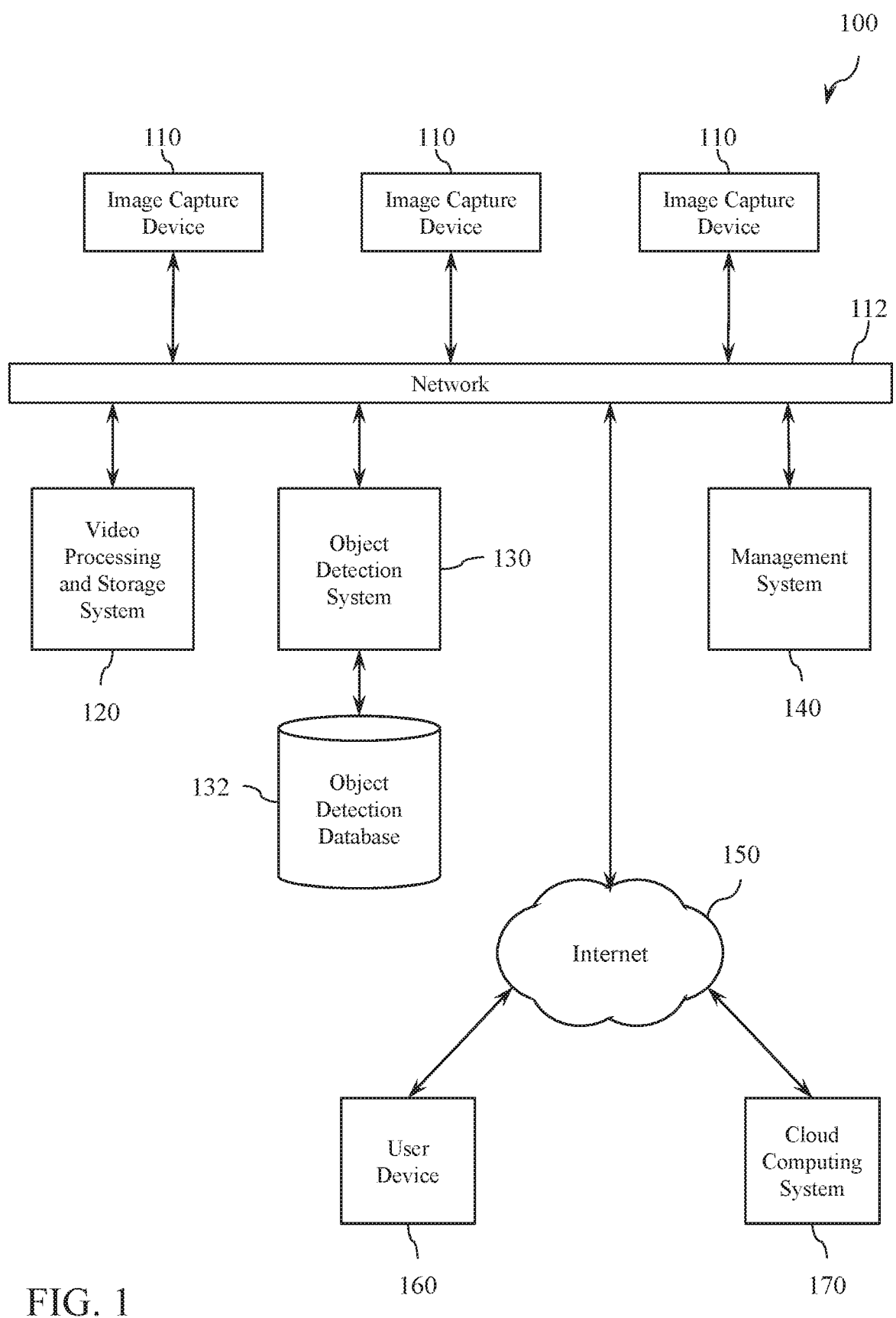
FIG. 1 is an embodiment of an exemplary thermal imaging system.

FIG. 1 illustrates an exemplary thermal imaging system 100 in accordance with an embodiment of the disclosure. The thermal imaging system 100 includes a plurality of image capture devices 110 connected to a network 112. The network 112 may be a local network such as a wireless local area network (WLAN), a wide area network such as the internet, or other network suitable for facilitating communications between components as described herein. The image capture components 110 may communicate with one or more other networked devices over wired and/or wireless communications paths, such as a user device 160, a video processing and storage system 120, an object detection system 130, a management system 140 and/or a cloud computing system 170. As shown, the image capture devices 110 may be connected to the network 112; however, the image capture devices 110 may also, or alternatively, be connected to another device such as a video processing system 120, or another processing, storage and/or encoding device.

The video processing system 120 is configured to receive thermal image video from the one or more image capture devices 110. In one embodiment, the image capture devices 110 are IP-enabled devices (e.g., IP-enabled thermal imaging cameras) connected to the network 112, and the video processing system 120 functions as a network video server for other devices on the network 112. The video processing system 120 may also receive data from image capture devices 110 and/or user device 160 and may provide data to the image capture devices 110 and/or user device 160 over network 112 and the Internet 150. For example, one or more image capture devices 110 may record thermal image data and provide a thermal video stream to the video processing and storage system 120. In an alternate embodiment, the image capture devices 110 are configured to provide a thermal video file and associated data to the video processing and storage system 120 when an object or event is detected in the captured thermal images. The thermal video file may include data associated with a detected object such as a moving object that extends from the time the object is detected in the field of view of the image capture component to the time the object leaves the field of view of the camera. In another embodiment, the thermal video files may be recorded and provided to cloud computing system 170 by video processing and storage system 120. In various configurations, video data associated with detected objects or events may be stored by any or all of image capture devices 110, video processing system 120, cloud computing system 170 and/or user device 160.

In one embodiment, the system 100 is a traffic monitoring and control system in which the image capture devices 110 detect objects such as cars, trucks, bicycles and pedestrians that are proximate to a monitored intersection. One or more image capture devices 110 may be positioned to monitor vehicle and pedestrian traffic that approaches and travels through the monitored intersection. The captured data may be stored on a network storage system, such as video processing and storage system 120, and used by the management system 140, user device 160, or other component of the system 100 to analyze traffic data or control the timing of traffic signals. The user of the traffic monitoring system may view the captured data associated with detected objects or events on the user device 160, by accessing (e.g., download, navigate, and/or stream) the thermal video data and object/event data from video processing system 120 (e.g., via network 112).

The video processing system 120 may include one or more processing, storage and/or encoding devices and components of the thermal imaging system, and may include one or more processors and one or more memory devices (e.g., volatile and/or non-volatile memory devices such as RAM (Random Access Memory), ROM (Read-Only Memory), EEPROM (Electrically-Erasable Read-Only Memory), flash memory, a disk drive, and/or other types of memory). In various embodiments, the video processing system 120 may be implemented as a digital video recorder (DVR), a network video recorder (NVR), and/or a device having both DVR and NVR capabilities.

Management system 140 includes software for configuring, administering and monitoring the thermal imaging system 110, and may be accessed remotely through user device 160. Each of user device 160 and management system 140 may be implemented as a computing device such as a desktop computer or a mobile computing device such as a mobile phone, tablet, personal digital assistant (PDA), laptop computer or other computing device having communications circuitry (e.g., wireless communications circuitry or wired communications circuitry) for connecting with other devices in system 100.

Object detection system 130 may include one or more servers such as an application server that performs image processing and/or other software execution operations for identifying objects in captured thermal images. The object detection system may include one or more processors (e.g., logic devices, microcontrollers, processors, application specific integrated circuits (ASICs), field programmable gate arrays (FPGAs) or other devices) that may be used by object detection system 130 to execute appropriate instructions, such as software instructions stored in memory of the object classification system 130.

An object detection database 132 is also provided which stores object classification criteria, such as thermal profiles for various objects, for use in determining whether an object is in a captured image stream and to classify such objects. In various embodiments, one or more features of the object detection system 130 may be integrated into an image capture device 110, the video processing system 120, the cloud computer system 170 or other devices connected to system 100. For example, an image capture device 110 for use in a traffic control system may include object detection processing components, allowing the image capture device 110 to detect objects such as automobiles, motorcycles, and pedestrians in real time.

Cloud computing system 170 may include one or more servers and/or one or more databases. According to various embodiments, cloud computing system 170 may include one or more processing servers such as an application server that performs data processing and/or other software execution operations for system 100 (e.g., video analytics, data compression or encoding, data encryption, synopsis video generation, and/or other applications), or may be provided with other functionality such as video storage capabilities. The cloud computer system may include one or more processors (e.g., logic devices, microcontrollers, processors, application specific integrated circuits (ASICs), field programmable gate arrays (FPGAs) or other devices) that may be used by cloud computing system 170 to execute appropriate instructions, such as software instructions stored in memory of the cloud computer system 170.

Figure 2:
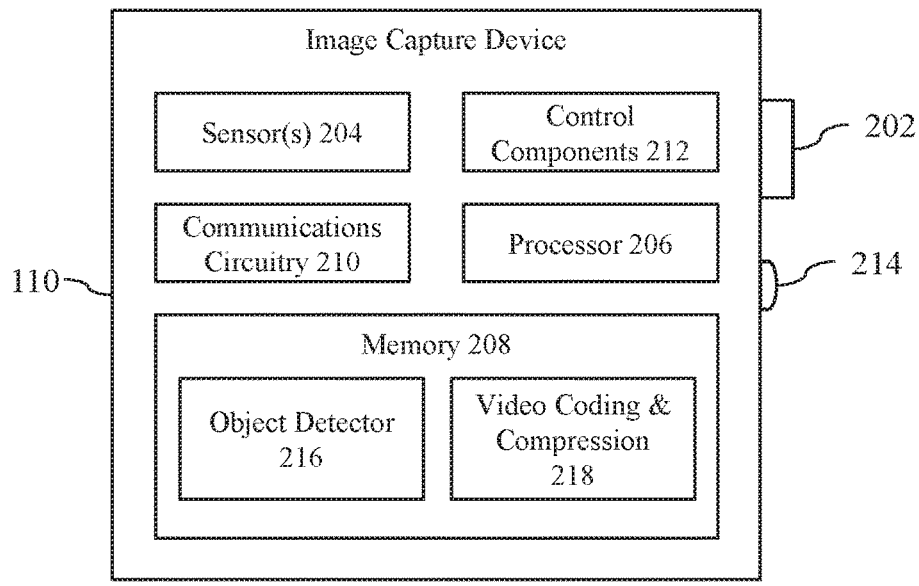
FIG. 2 is an embodiment of an exemplary thermal capture device.

As shown in FIG. 2, an embodiment of an image capture device 110 may include components of a thermal imaging camera configured to capture and transmit thermal video, such as imaging components (e.g., thermal imaging elements 202 and one or more thermal sensors 204), processor 206, memory 208, communications circuitry 210 and control components 212. The image capture device 110 may represent any type of IR camera, thermal imaging system or video camera and is not limited to any specific embodiment disclosed herein. The components illustrated in FIG. 2 may be implemented as a standalone IR camera in one embodiment, may be distributed among a plurality of different devices, or may include additional components of the system described in FIG. 1.

The image capture device 110 captures thermal images through one or more thermal image sensors 204 which may be arranged to receive a heat map through thermal imaging elements 202. The thermal imaging sensors 204 may be implemented with a focal plane array (FPA) of sensors that detects infrared (IR) radiation, such as thermal IR radiation, to provide thermal images. For example, thermal radiation passing through the thermal imaging element 202 of an IR camera is received by IR sensors of the FPA, which provide image data for pixels of thermal images. The FPA may be configured to detect IR radiation from a scene for a field of view of the FPA and provide IR image data (e.g., via analog or digital signals) representing the detected IR radiation. The FPA sensors 204 may be implemented using any suitable type of IR detectors (e.g., quantum wells, microbolometers, thermopiles, or other types of detector elements responsive to IR radiation) that are arranged in a suitable pattern (e.g., a rectangular array, a square array, a one-dimensional array, or other arrangements) as may be desired for particular implementations.

The FPA may be coupled to, or integrated with, a read out integrated circuit (ROIC) configured to generate analog or digital signals corresponding to the intensity of IR radiation received at each IR detector of FPA sensor 204 and to interface with other components such as processor 206. Further examples of ROICs and IR detectors of an FPA may be found in U.S. Pat. No. 6,028,309, issued Feb. 22, 2000, and entitled "Methods and Circuitry for Correcting Temperature-Induced Errors in Microbolometer Focal Plane Array," which is incorporated herein by reference in its entirety.

In various embodiments, other sensor components capable of imaging the visible field of view received through optical elements 202 may also be included such as charge-coupled device (CCD) sensor, an electronic multiplying CCD (EMCCD) sensor, a complementary metal-oxide-semiconductor (CMOS) sensor, or a scientific CMOS (sCMOS) sensor. In various embodiments, sensor(s) 204 may include imaging sensors sensitive to visible light in one or more wavelength bands and/or other sensors (e.g., environmental sensors such as humidity, temperature, location, or other sensors). Imaging sensors may include a thermal infrared sensor, visible light sensor, a long wavelength infrared (LWIR) sensor, a mid wavelength infrared (MWIR) sensor, a short wavelength infrared (SWIR) sensor, a near infrared (NIR) sensor, and/or one or more hybrid image sensors for capturing images in response to light in multiple different wavelength bands. Sensor(s) 204 may further include other types of sensors such as a microphone 214 for detecting sounds, a thermometer, or a humidity sensor.

Optical elements 202 may include one or more lenses, filters, films, gratings, prisms, beam splitters, or other suitable optical elements for filtering, focusing, zooming, and/or otherwise blocking, passing, processing, and/or directing infrared radiation (thermal imaging) or light onto one or more of sensors 204. Optical elements 202 may be implemented, for example, with athermalized optics including one or more lenses, and configured to focus the IR radiation onto the FPA sensor 204.

Processor 206 may be implemented as any appropriate processing device (e.g., logic device, microcontroller, processor, application specific integrated circuit (ASIC), a field programmable gate array (FPGA), or other device) that may be used by image capture device 110 to execute appropriate instructions, such as software instructions stored in memory 208, which include object detector logic 216 and video coding and compression logic 218. Processor 206 may operate one or more of sensors 204 to capture images such as thermal images and to store some or all of the thermal images or other collected data depending on configuration or mode of the operation.

Memory 208 may include one or more memory devices (e.g., memory components) that store data and information, including image data (e.g., including thermal imaging data), audio data, network information, camera information, and/or other types of sensor data, and/or other monitoring information. The memory devices may include various types of memory for information storage including volatile and non-volatile memory devices, such as RAM (Random Access Memory), ROM (Read-Only Memory), EEPROM (Electrically-Erasable Read-Only Memory), flash memory, a disk drive, and other types of memory described herein. In one embodiment, memory 208 may include a portable memory device that can be removed from video capture device 110 and used to convey stored data to other systems. In some embodiments, processor 206 may be configured to execute software instructions stored on memory 208 to perform various methods, processes, or operations in the manner described herein.

The optional object detection logic 216 includes executable instructions for causing the processor 206 to analyze the captured thermal image stream to detect the presence of an object or motion. In various embodiments, the image capture device 110 is configured to capture thermal images of its field of view which is analyzed for heat signatures against a background image to determine the presence of an object. For example, in a traffic monitoring application the processor 206 may execute detection instructions 216 to compare one or more consecutive thermal images and detect (e.g., by comparing a captured image to a known background image and heat signatures of known objects) the presence of an object while the object is in the field of view of the image capture device 110. In one embodiment, an object detection process may include a frame-to-frame difference calculation to detect a threshold motion to identify the presence of an object. For example, the entire image, image regions or individual pixels may be compared between frames to determine whether the measured differences exceed the predetermined threshold value.

Communications circuitry 210 may include circuitry for communicating with other devices using various communications protocols. As examples, communications circuitry that may be included in a camera such as a network camera may include near field communications (NFC) circuitry (e.g., a powered or unpowered NFC integrated circuit that generates, receives, and/or processes communication signals according to radio-frequency identification (RFID) standards such as the ISO/IEC 14443, ISO/IEC 18092 or FeliCa standards), wireless network (WiFi®) circuitry, a modular cellular component that generates, receives, and/or processes communications signals over one or more cellular data networks, wireless communication components that generate, receive, and/or process communications signals based on, for example, the Bluetooth® standard, other appropriate short range wireless communication standards circuitry, a wireless broadband component (e.g., based on WiMax technologies), a wireless satellite component, or other appropriate wireless communication components.

Communications circuitry 210 may also be configured for a proprietary wireless communication protocol and interface based on radio frequency (RF), microwave frequency (MWF), infrared frequency (IRF), and/or other appropriate wireless transmission technologies. Communications circuitry 210 may include one or more antennas for wireless communication purposes. Thus, in one example, communications circuitry 210 may handle, manage, or otherwise facilitate wireless communication by establishing wireless communication links to a wireless router, hub, or other appropriate wireless devices.

Communications circuitry 210 may also be configured to interface with a wired network and/or device via a wired communication component such as an Ethernet interface, a power-line modem, a Digital Subscriber Line (DSL) modem, a Public Switched Telephone Network (PSTN) modem, a cable modem, and/or other appropriate components for wired communication. Proprietary wired communication protocols and interfaces may also be supported by communications circuitry 210. Communications circuitry 210 may be configured to communicate over a wired communication link (e.g., through a network router, switch, hub, or other network devices) for wired communication purposes. For example, a wired link may be implemented with a power-line cable, a coaxial cable, a fiber-optic cable, or other appropriate cables or wires that support corresponding wired network technologies.

Communications circuitry 210 may be used to provide thermal video files, data, instructions, and messaging to video processing system 120, object detection system 130 and/or cloud computer system 170. Communications circuitry 210 may also be used to provide stored and/or streaming video to user device 160. The video file may be compressed before transmission, such as with industry standard video compression formats which may include MPEG-2, MPEG-4, H.263, H.264, and MJPEG standards to reduce network bandwidth and image processing constraints and storage capacity requirements.

Control components 212 may include one or more buttons, indicators (e.g., LEDs), keyboards, displays, trackballs, knobs, joysticks, and/or other type of user interface adapted to accept user input and/or provide user feedback.

Figure 3:
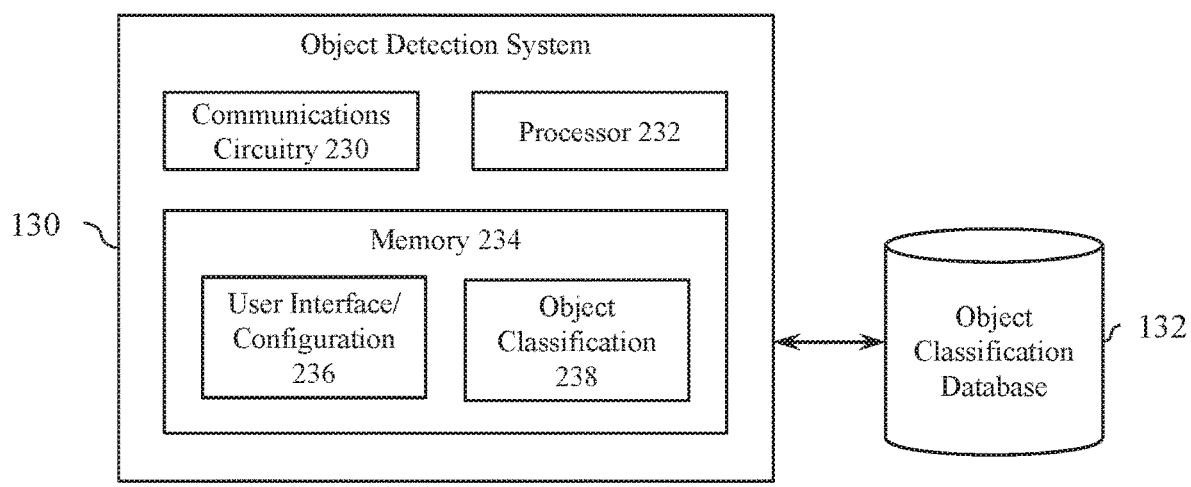
FIG. 3 is an embodiment of an exemplary object detection system.

Referring to FIG. 3, an embodiment of an object detection system 130 includes one or more servers and/or one or more databases 132. According to various embodiments, object detection system 130 may be a dedicated server for performing object detection and classification and analysis operations on captured thermal video images. In alternate embodiments, such object detection may be performed on the image capture device. As illustrated, object detection system 130 includes one or more processors 232 that perform data processing and/or other software execution operations for object detection system 130. The processor 232 may include logic devices, microcontrollers, processors, application specific integrated circuits (ASICs), field programmable gate arrays (FPGAs) or other devices that may be used by object detection system 130 to execute appropriate instructions, such as software instructions stored in memory 234 (e.g., user interface and configuration 236, object detection and image classification 238, and/or other applications).

Object detection system 130 may receive data from image capture device 110, user device 160 or other networked devices through communications circuitry 230, and may provide data to image capture device 110, video processing system 120, user device 160, and/or other system devices over network 112. For example, one or more image capture devices 110 may monitor a field of view for the presence of certain objects, such as a car, bicycle or pedestrian, and receive object heat map data from the object detection system 130 for use in object detection and classification. In other configurations, the image capture device 110 identifies motion or the presence of an object and provides corresponding video segment to the object detection system 130 for further analysis. The video segment may include, for example, video data of a detected object such as a moving object that extends from a time prior to the object being detected in the field of view of the camera to the time the object leaves the field of view of the camera.

The object detection system 130 interfaces with the analysis/classification database 132 allowing a comparison of an identified object to stored image information. The stored image information includes information allowing for real-time classification of the identified object, and may include general image classification criteria (e.g., heat profile, size, shape, features, and/or colors of various classes of objects), as well as location specific criteria (e.g. location of a traffic lane, door or other objects typically found at the location). In one embodiment, the database 132 stores criteria for identifying both relevant objects (e.g., person, vehicle) and objects that may generate a false alarm (e.g., shadows, rain, wind, family pet).

The database 132 may operate using general classification criteria and may be further populated manually by the system operator through a user interface allowing the operator to identify known objects in video images, for example, by providing user configured feedback in response to motion detection triggers. In one embodiment, newly detected objects are added to the database 132 for later classification by the operator. The operator may also configure the object classification system 130 to set thresholds or other criteria for modeling and training of object classification information.

The user device 160 may access the object classification system 130 through a user interface 236 that allows the user to configure the object detection system 130, including controlling the classes of objects that are relevant, providing user feedback on the relevance of previously detected objects, and tuning the confidence level needed to identify objects.

The object detection and classification logic 238 provides analysis of the captured images to detect and classify an object in a captured image. The object detection system 130 interfaces with the object classification database 132, which stores configurable information for analyzing and identifying digitized objects and other sensor information captured by the image capture device 110. The database 132 may store object classification criteria for generally identifying the class of a detected object (e.g., a person, an animal, a car, motorcycle, plant life, blowing objects, a shadow, etc.), reference images of known objects, field of view parameters for each video capture device 110 (e.g., to for use in estimating object size), learned and configured activities common to each video capture device 110 (e.g., false detections and classifications of objects may have been triggered by a nonstandard event), and other object classification information.

In operation, the object detection system 130 receives thermal images or video segments from the image capture device 110, isolates the digitized object, finds the best matches to a record in the object database and determines whether the object is indicative of relevant activity in accordance with user settings. For example, in one embodiment the object detection and classification system may be configured to identify and count traffic at an intersection. An image capture device may capture a background image in response to IR radiation from a background and identify potential objects by capturing images that have higher pixel values for pixels corresponding to IR radiation in the foreground. These images may be used to detect and classify objects, track objects through the field of view, count vehicles and pedestrians, and perform other traffic control related functions.

In many applications, it is desirable to capture, process and store images and video streams using a high resolution, high frame rate and high pixel depth. For example, image processing and object detection and classification may be more accurate as more information is captured for each image, and users often prefer higher quality images for visual inspection of a captured scene. However, the large volume of image and video data produced by each image capture device 110 in a thermal imaging system can overwhelm system components, processing resources, storage capacity and communications infrastructure. In addition, application requirements such as real-time processing of image data (e.g., in traffic control or security monitoring) may further lead to a system configuration and dedicated components that operate on smaller image sizes.

In one embodiment, the sensor 202 of an image capture device 110 is configured to capture high definition images at 30 fps, with 14-bits of information for each pixel, but other software and hardware components of the thermal imaging system may be configured to processing images having 8-bit pixel depth. The processing and communications bandwidth limitations of certain components may dictate a further reduction in the size of the image data to meet real-time processing requirements. As a result, the resolution and/or bit depth of acquired thermal images may be down-converted and compressed to an 8-bit video stream using a video compression format (e.g., H.264 or MPEG4) for image processing, storage and playback by the system or network. The loss of image data, however, may degrade the performance of other hardware and software components in the thermal imaging system, such as various image processing algorithms, which may be fully capable of processing images using the full 14-bits per pixel of data.

Figure 4:
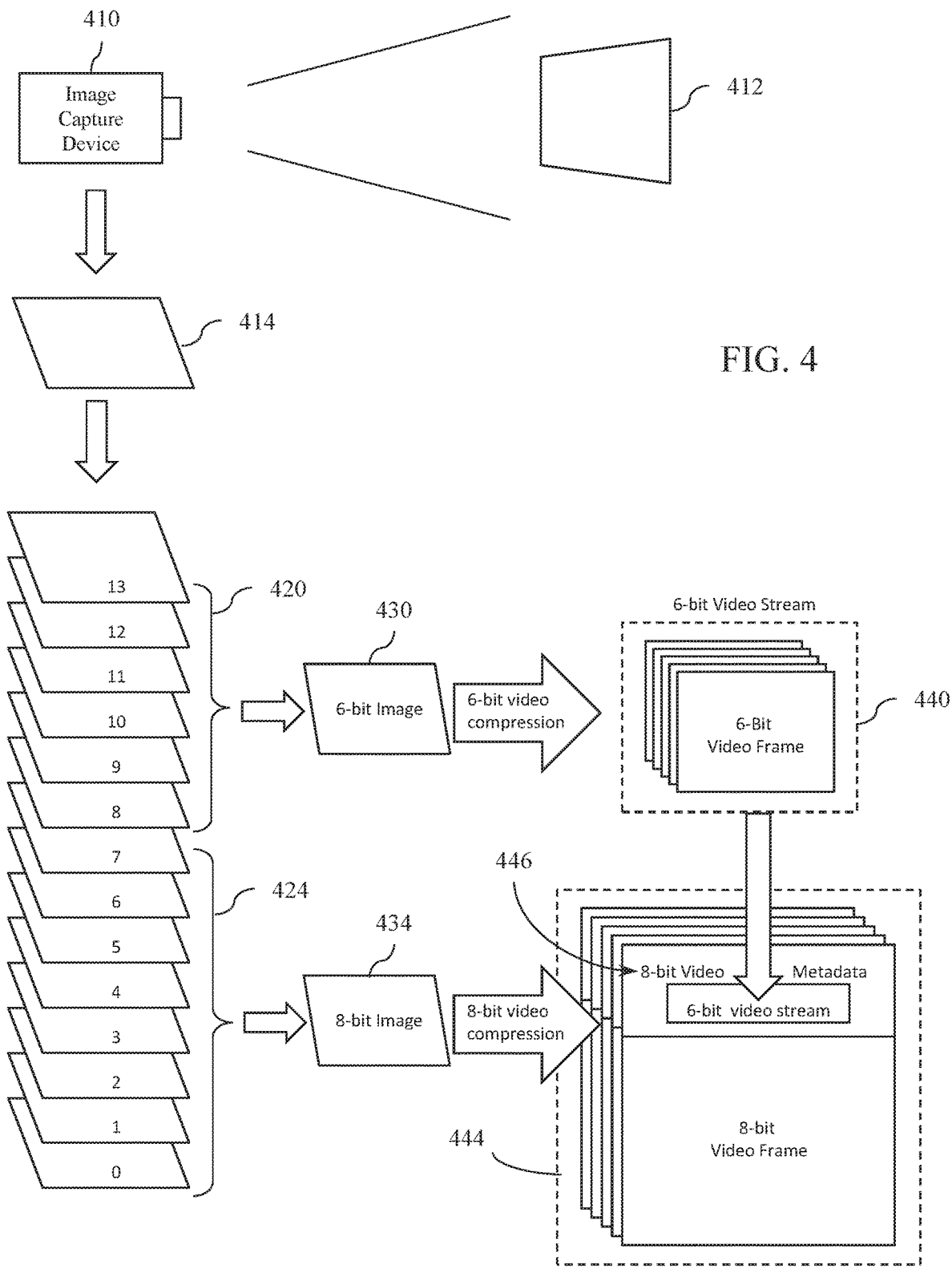
FIG. 4 is a diagram illustrating an exemplary method for encoding video in accordance with an embodiment.

Referring to FIG. 4, an embodiment of an exemplary method that maintains high bit per pixel image data (e.g., 14-bit data) in a captured video stream will now be described. In the illustrated embodiment, image data is maintain while the thermal video data is processed through system components that are limited to a lower per pixel depth by hardware, software, processing, bandwidth or other system restrictions (e.g., 8-bit components).

An image capture device 410 captures a series of thermal images of its field of view 412 and is configured to digitize and store in local memory successive captured images 414. In the illustrated embodiment, each pixel of the image 414 is represented by 14 bits of data quantifying the sensed temperature at a corresponding location in the field of view 412. It is observed for many surveillance and thermal imaging applications that the lowest 8-bits of information (424) provide the most significant image data and is sufficient for many thermal image applications. The highest 6 bits of information (420) provide additional image detail and typically have a low variation allowing for high compression. Each image 414 is thus split into two sub-images, a 6 bit image representing the highest 6 bits at each pixel (430), and an 8-bit image, representing the lowest 8 pixels (434). In one embodiment, various system components are configured to process 8-bit image data.

The 8-bit image is compressed in accordance with a video compression algorithm such as H.264 or MPEG4, which produces a series of video frames in a compressed 8-bit video stream (444). In one embodiment, each frame includes an 8-bit frame of thermal video data and associated metadata 446, which may take the form of header information for the frame. The captured video stream may be digitized into a series of frames in accordance with a video compression standard that utilizes key frames (I-frames) and at least one type of intermediary frame, such as predictive pictures (P-frames) and bi-predictive pictures (B-frames). A key frame (I-frame) is a stand-alone picture that is compressed without reference to other frames. A predictive frame (P-frame) includes only the changes from the previous frame, and a bi-predictive frame (B-frame) is coded to include differences from the preceding and succeeding frames in the video to further reduce the frame size.

The 6-bit images are compressed into a separate 6-bit video stream 440, which may use the same video compression algorithm as the 8-bit video stream 444, or a different lossy or lossless compression algorithm. The compressed 6-bit video stream is then merged into the 8-bit video stream as metadata. In one embodiment, each 8-bit video frame includes metadata that stores the corresponding 6-bit frame. As a result, the 14-bit image data is preserved in an 8-bit video format, allowing the video stream to be processed on software and hardware that is configured to handle 8-bit thermal image processing, while maintaining the 14-bit image data for other components of the thermal imaging system. It will be appreciated that the video compression method of the present disclosure is not limited to the specific embodiment illustrated in FIG. 4, and that other pixel depths may be used for the image data and two data streams.

Figure 5A:
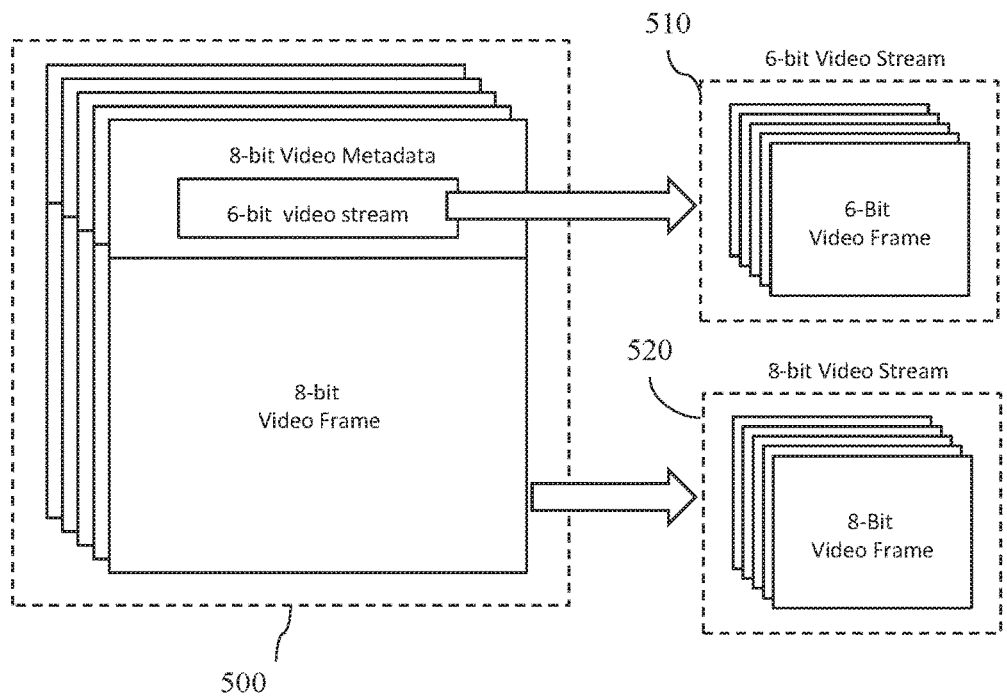
FIGS. 5a-b are diagrams illustrating an exemplary method for decoding video in accordance with an embodiment.
Figure 5B:
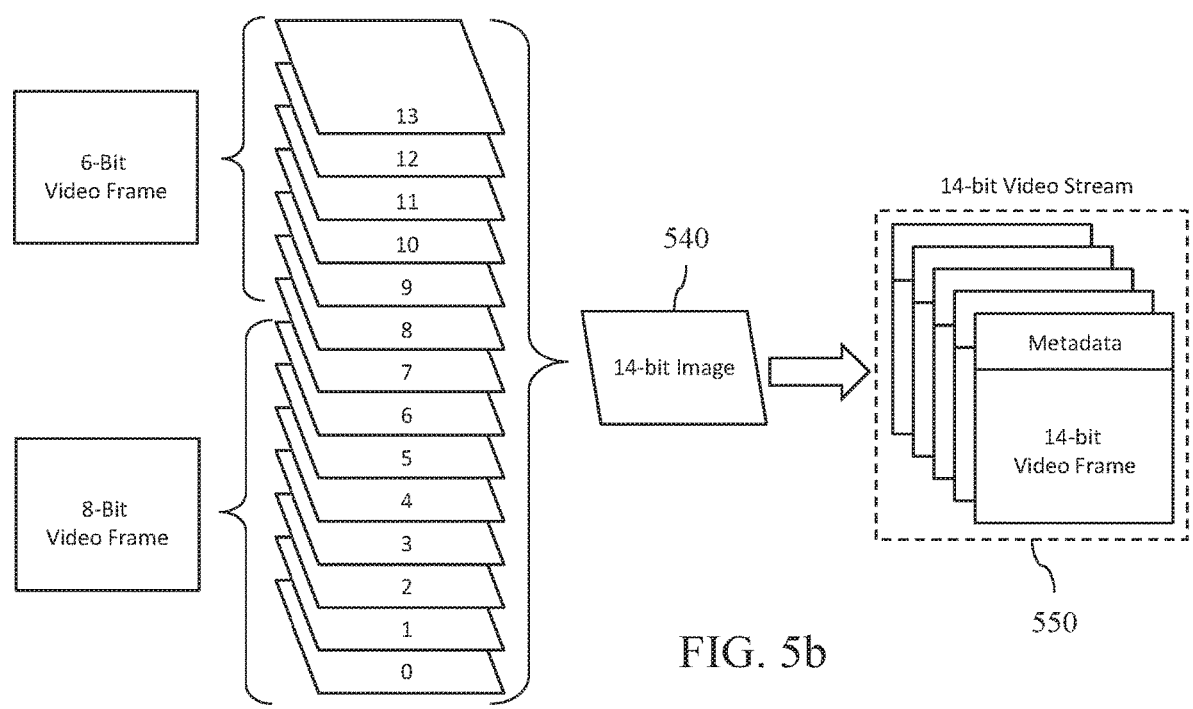

Referring to FIGS. 5a and 5b, an exemplary method for decoding the 8-bit video data of FIG. 4 will now be discussed. The video data 500 may be decoded into an 8-bit video stream 520 through a conventional video decoding algorithm suitable for the compression format used. In that embodiment, the corresponding metadata may be ignored.

To extract the full 14-bit video stream, the metadata is extracted into a compressed 6-bit video stream, and then decoded to a 6-bit video stream 510. Each frame of the 6-bit video stream has a corresponding 8-bit frame from the 8-bit video stream. The 8-bit data in each frame represents the 8 most significant bits of pixel depth, and is combined with the 6-bit data in the corresponding frame, which represents 6 least significant bits of pixel depth, to form a 14-bit image frame 540. The 14-bit frame may be processed by the thermal imaging system, or compressed and stored as a 14-bit data stream 550 for subsequent use by components of the thermal imaging system that are adapted to handle high-bit depth images.

Figure 6:
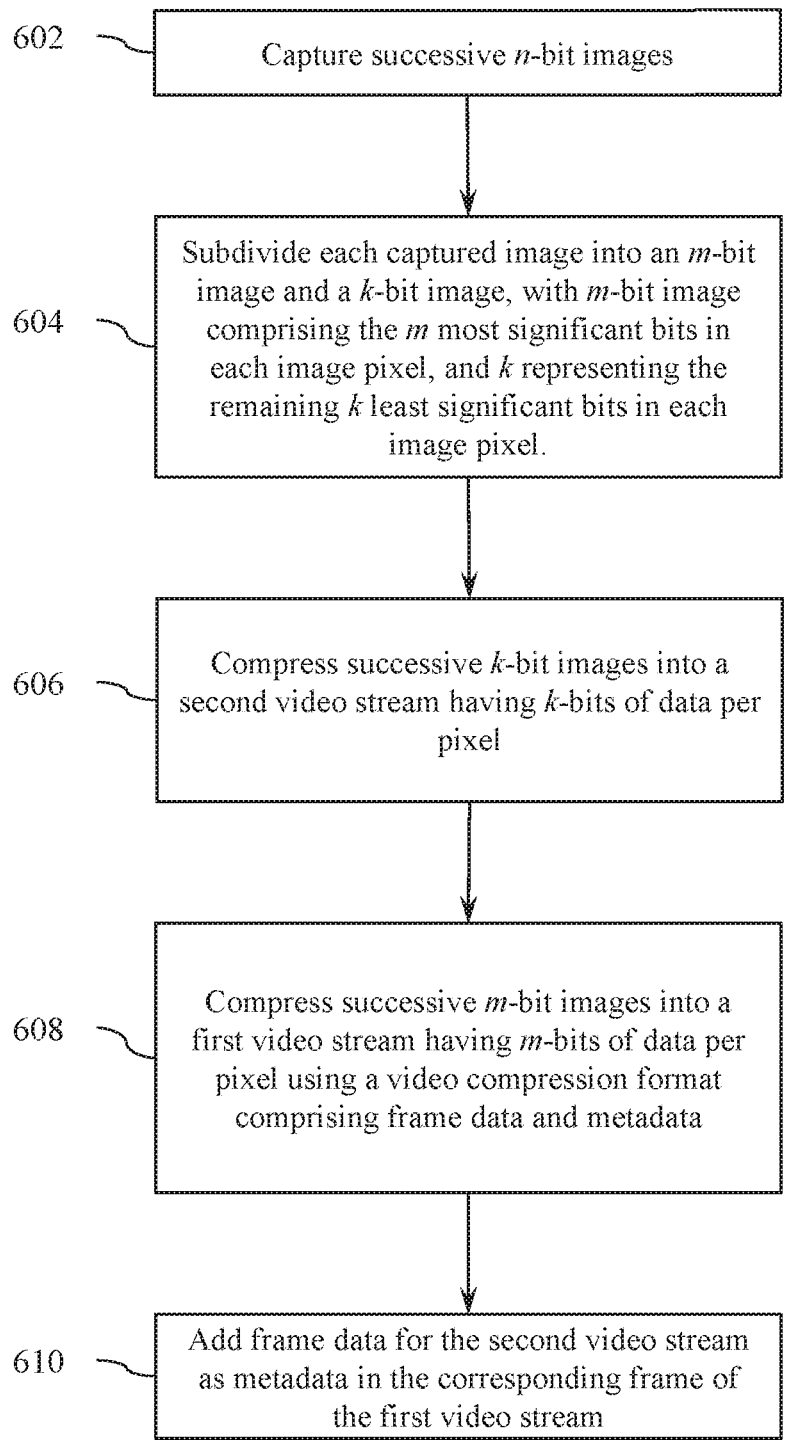
FIG. 6 is a flow diagram illustrating an exemplary method for encoding video in accordance with an embodiment.

Referring to FIG. 6, an embodiment of a method for retaining n-bit image data (e.g., 14-bit image) in an m-bit system (e.g., 8-bit system) will now be described. In step 602, successive images are captured by an image capture device. The images may be thermal images, visual images, or represent other sensed information in the field of view of the image capture device. Each pixel of the captured images is represented by n-bits of data, where n is a positive integer. In step 604, each captured image frame is subdivided into (i) a first image comprising the m most significant bits of data for each image pixel, and (ii) a second image comprising the k least significant bits of data for image pixel, where k=n−m.

In step 606, the second stream of k-bit images is compressed and encoded into a second video stream. In various embodiments, the video compression for the second video stream may be a lossy compression format, such as H.264 or MPEG4, or a lossless video format, such as FFV1. In step 608, the first stream of m-bit images is compressed and encoded into a first video stream. In various embodiments the compression format is H.264, MPEG4 or another video compression algorithm that includes frame level metadata data. In step 610, each encoded frame from the second video stream is added as metadata to the corresponding frame of the first video stream. The encoded video stream may be processed as m-bit video data through standard decoding techniques by ignoring the metadata. The encoded video stream may also be used to reconstruct the original n-bit (e.g., 14-bit) images captured by the image capture device.

Figure 7:
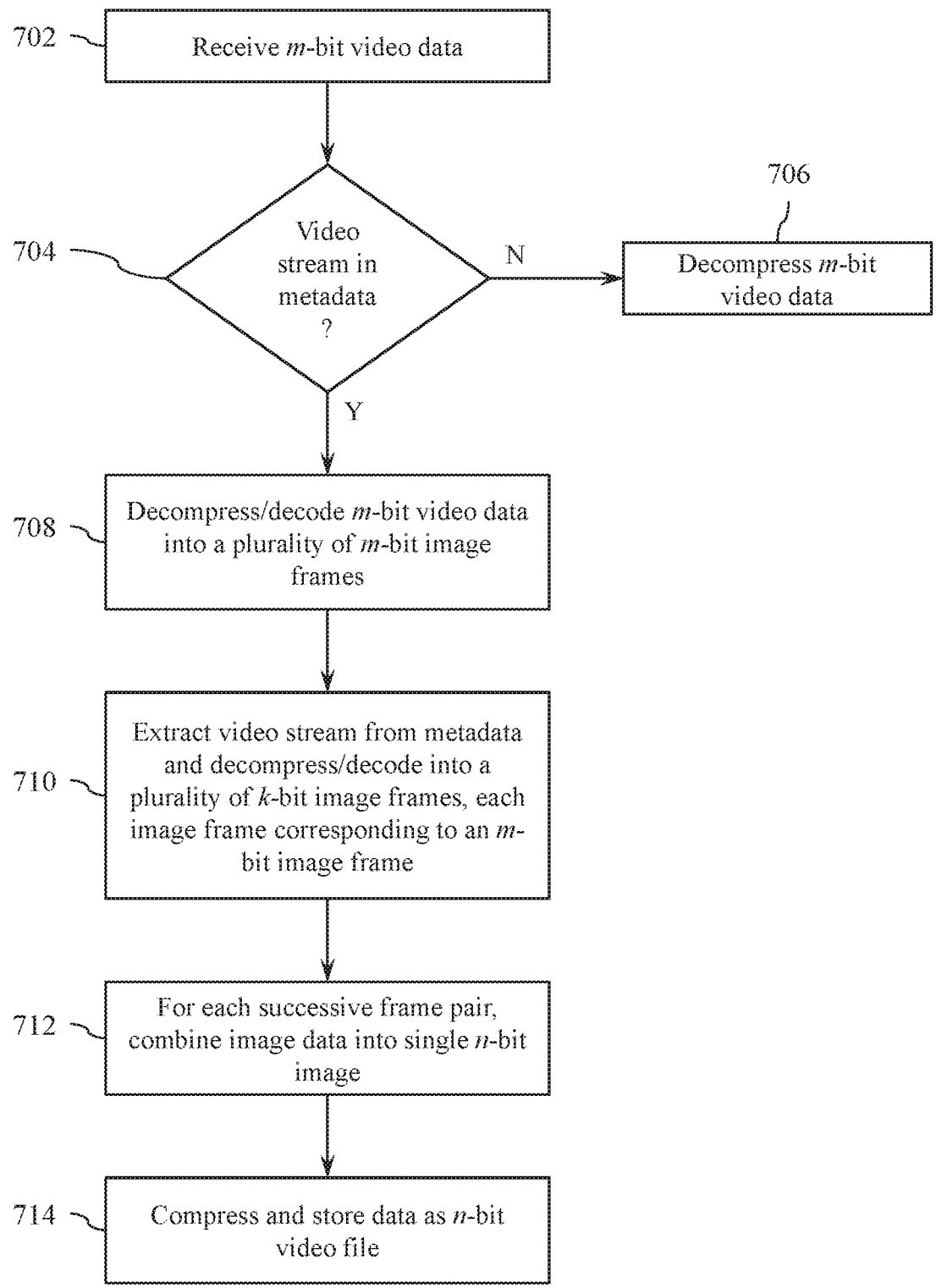
FIG. 7 is a flow diagram illustrated an exemplary method for decoding video in accordance with an embodiment.

Referring to FIG. 7, an embodiment of a computer implemented method for decoding the video data of FIG. 6 will now be described. In step 702, a component of the thermal imaging system receives m-bit video data. In step 704, metadata of the m-bit video data is analyzed to determine whether a second video stream is present. If the metadata does not contain a second video stream, then (step 706) the m-bit video data is decoded using standard decoding techniques and the resulting m-bit video images may be used for further image processing. If a second video stream is found in the metadata, then (step 708) the m-bit data is decoded into a plurality of successive m-bit video frames. Next, the second video stream is extracted from the metadata and decoded into a plurality of k-bit image frames (step 710). Each k-bit image frame corresponds to an m-bit image frame. In one embodiment, the metadata for a given m-bit frame includes the corresponding k-bit frame information. In alternate embodiments, the k-bit data frames may be stored as metadata across multiple frames.

Each decoded/decompressed pair of corresponding image frames is next combined into a single n-bit image, where n=m+k (step 712). The n-bit image stream may be used in real time for image processing or other system functions, or optionally, may be decoded into an n-bit video file (step 714).

It will be appreciated that the embodiments of FIGS. 1-7 described above may allow 14-bit video images to be maintained and used in 8-bit imaging systems, without a loss of performance or video information in converting the 14-bit video image to 8-bit images for processing. In various embodiments, the disclosed systems and methods allow for the preservation of video data while addressing various hardware, software, configuration, communications bandwidth, processing and storage limitations.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system for capturing and processing video data comprising:
an image capture device configured to digitize a captured image, the image capture device comprising a memory and a processor configured to control the image capture device, the processor adapted to:
receive successive images captured from the image capture device, the captured images having a plurality of pixels having a bit depth of n;
subdivide each captured image into an m-bit image and a k-bit image, wherein the m-bit image comprises the m most significant bits of data for each pixel in the captured image, wherein the k-bit image comprises the remaining k bits of data for each pixel in the captured image;
compress successive k-bit images into a k-bit video stream;
compress successive m-bit images into an m-bit video stream, wherein the m-bit video stream includes a plurality of frames, each frame including m-bit video data and metadata; and
merge the k-bit video stream into the metadata of the m-bit video stream to obtain a decodable m-bit video stream which is detectable as including the k-bit video stream in the metadata in an operation of detecting whether the decodable m-bit video stream includes the k-bit video stream in the metadata, the k-bit video stream being decodable into an n-bit video stream, the k-bit video stream being detectable in the decodable m-bit video stream, the k-bit video stream being extractable and decodable into a plurality of k-bit images, the decodable m-bit video stream being decodable into a plurality of m-bit images.

2. The system of claim 1, wherein the k-bit video stream comprises a k-bit frame corresponding to a frame of the m-bit video stream but merged into the metadata across multiple frames of the m-bit video stream.

3. The system of claim 1, wherein the k-bit video stream is compressed using lossless compression.

4. The system of claim 1, wherein the m-bit video stream is compressed using one of H.264 and MPEG4 compression.

5. The system of claim 1, wherein the processor is further adapted to decode the decodable m-bit video stream using an m-bit decoder.

6. The system of claim 1 further comprising an image processing server adapted to:
receive the decodable m-bit video stream; and
decode the decodable m-bit video stream into an n-bit video stream.

7. The system of claim 6 wherein the image processing server is further adapted to:
detect whether the decodable m-bit video stream includes the k-bit video stream in the metadata; and
if the k-bit video stream is detected in the metadata, extract and decode the k-bit video stream, into a plurality of k-bit images, and decode the decodable m-bit video stream into a plurality of m-bit images.

8. The system of claim 7 wherein the image processing server is further adapted to:
combine each k-bit image with a corresponding m-bit image to form an n-bit image, wherein the m-bit image data comprises the most significant bits of each n-bit image pixel and the k-bit image data comprises the least significant bits of the each n-bit image pixel.

9. A computer-implemented method comprising:
receiving a video stream comprising a sequence of captured images, the captured images having a pixel bit depth of n;
subdividing each captured image into an m-bit image and a k-bit image, wherein the m-bit image comprises the m most significant bits of data for each pixel in the captured image, wherein the k-bit image comprises the remaining k bits of data for each pixel in the captured image;
encoding successive k-bit images into a k-bit video stream;
encoding successive m-bit images into an m-bit video stream, wherein the m-bit video stream includes a plurality of frames, each frame including m-bit video data and metadata; and
merging the k-bit video stream into the metadata of the m-bit video stream to obtain a decodable m-bit video stream from which the k-bit video stream is extractable and decodable into a plurality of k-bit images, the decodable m-bit video stream being detectable as including the k-bit video stream in the metadata in an operation of detecting whether the decodable m-bit video stream includes the k-bit video stream in the metadata, the decodable m-bit video stream being decodable into a plurality of m-bit images.

10. The method of claim 9, wherein the k-bit video stream comprises a portion corresponding to a frame of the m-bit video stream but merged into the metadata across multiple frames of the m-bit video stream.

11. The method of claim 9, wherein the k-bit video stream is compressed using lossless compression.

12. The method of claim 9, wherein the m-bit video stream is compressed using one of H.264 and MPEG4 compression.

13. The method of claim 9, further comprising decoding the decodable m-bit video stream using an m-bit decoder.

14. The method of claim 9 further comprising receiving the decodable m-bit video stream and decoding decodable the m-bit video stream into an n-bit video stream.

15. The method of claim 9 further comprising detecting whether the decodable m-bit video stream includes the k-bit video stream in the metadata;
if the k-bit video stream is detected in the metadata, extracting and decoding the k-bit video stream, into a plurality of k-bit images; and
decoding the decodable m-bit video stream into a plurality of m-bit images.

16. The method of claim 15 further comprising
combining each k-bit image with a corresponding m-bit image to form an n-bit image, wherein the m-bit image data comprises the most significant bits of each n-bit image pixel and the k-bit image data comprises the least significant bits of the each n-bit image pixel.

17. An image capture device configured to digitize a captured image, the image capture device comprising:
a memory storing program instructions for controlling the image capture device; and
a processor configured to execute the stored program instructions to:
receive successive images captured from the image capture device, the captured images having a plurality of pixels having a bit depth of n;
subdivide each captured image into an m-bit image and a k-bit image, wherein the m-bit image comprises the m most significant bits of data for each pixel in the captured image, wherein the k-bit image comprises the remaining k bits of data for each pixel in the captured image;
compress successive k-bit images into a k-bit video stream;
compress successive m-bit images into an m-bit video stream, wherein the m-bit video stream includes a plurality of frames, each frame including m-bit video data and metadata; and
merge the k-bit video stream into the metadata of the m-bit video stream to obtain a decodable m-bit video stream from which the k-bit video stream is extractable and decodable into a plurality of k-bit images, the decodable m-bit video stream being detectable as including the k-bit video stream in the metadata in an operation of detecting whether the decodable m-bit video stream includes the k-bit video stream in the metadata, the decodable m-bit video stream being decodable into a plurality of m-bit images.

18. The image capture device of claim 17, wherein the m-bit video stream is compressed using one of H.264 and MPEG4 compression.

19. The image capture device of claim 17, wherein the processor is further adapted to merge a k-bit video stream portion corresponding to a frame of the m-bit video stream into the metadata across multiple frames of the m-bit video stream.

20. The image capture device of claim 17, wherein the processor is further adapted to:
detect whether the decodable m-bit video stream includes the k-bit video stream in the metadata;
if the k-bit video stream is detected in the metadata, extract and decode the k-bit video stream, into a plurality of k-bit images, and decode the decodable m-bit video stream into a plurality of m-bit images; and
combine each k-bit image with a corresponding m-bit image to form an n-bit image, wherein the m-bit image data comprises the most significant bits of each n-bit image pixel and the k-bit image data comprises the least significant bits of the each n-bit image pixel.

* * * * *

UNITED STATES PATENT AND TRADEMARK OFFICE
CERTIFICATE OF CORRECTION

PATENT NO. : 10,986,338 B2
APPLICATION NO. : 16/209586
DATED : April 20, 2021
INVENTOR(S) : De Muynck Page 1 of 1

It is certified that error appears in the above-identified patent and that said Letters Patent is hereby corrected as shown below:

In the Specification

Column 2, Line 36, change "where k=-m" to --where k=n-m--.

Column 11, Line 14, change "the in most significant bits" to --the m most significant bits--.

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*